(12) United States Patent
Kube et al.

(10) Patent No.: US 8,433,542 B2
(45) Date of Patent: Apr. 30, 2013

(54) TESTING FRAMEWORK FOR CONTROL DEVICES

(75) Inventors: Nathan John Walter Kube, Vancouver (CA); Frank Marcus, Port Moody (CA)

(73) Assignee: Wurldtech Security Technologies, Vancouver (CA)

( * ) Notice: Subject to any disclaimer, the term of this patent is extended or adjusted under 35 U.S.C. 154(b) by 445 days.

(21) Appl. No.: 12/395,363

(22) Filed: Feb. 27, 2009

(65) Prior Publication Data

US 2009/0254312 A1 Oct. 8, 2009

Related U.S. Application Data

(60) Provisional application No. 61/032,046, filed on Feb. 27, 2008, provisional application No. 61/077,459, filed on Jul. 1, 2008.

(51) Int. Cl.
*G06F 15/00* (2006.01)

(52) U.S. Cl.
USPC .......................................... 702/186; 702/122

(58) Field of Classification Search .......... 702/117–120, 702/122–125, 186; 714/725, 735–738, 742
See application file for complete search history.

(56) References Cited

U.S. PATENT DOCUMENTS

| | | | |
|---|---|---|---|
| 5,724,273 A | 3/1998 | Desgrousilliers et al. | |
| 5,913,023 A | 6/1999 | Szermer | |
| 6,125,457 A | 9/2000 | Crisan et al. | |
| 6,195,616 B1 * | 2/2001 | Reed et al. | 702/119 |
| 7,290,193 B2 * | 10/2007 | Kadkade et al. | 714/742 |
| 7,340,364 B1 * | 3/2008 | Kumaki | 702/118 |
| 7,343,587 B2 | 3/2008 | Moulden, Jr. et al. | |
| 7,480,900 B1 | 1/2009 | Zhou et al. | |
| 8,006,136 B2 | 8/2011 | Kube et al. | |

(Continued)

FOREIGN PATENT DOCUMENTS

| | | |
|---|---|---|
| CN | 11094118 A | 12/2007 |
| WO | WO 2006/106502 A1 | 10/2006 |
| WO | WO 2006106502 A2 | 10/2006 |
| WO | WO 2009/046525 A1 | 4/2009 |

OTHER PUBLICATIONS

Bird, D.L., and C.U. Munoz, Automatic Generation of Random Self-Checking Test Cases, IBM Systems Journal, 1983, vol. 22, Issue 3, pp. 229-245.

(Continued)

*Primary Examiner* — Manuel L Barbee
(74) *Attorney, Agent, or Firm* — Knobbe Martens Olson & Bear LLP

(57) ABSTRACT

The present disclosure generally relates to the automated testing of a system that includes software or hardware components. In some embodiments, a testing framework generates a set of test cases for a system under test using a grammar. Each test case may perform an action, such as provide an input to the system under test, and result in an output from the system under test. The inputs and outputs are then compared to the expected results to determine whether the system under test is performing correctly. Specifically, the system under test may be analyzed to determine whether it is capable of properly processing control instructions and input signals and/or generating expected output control signals and additional control/feedback information. The data can then be interpreted in the grammar system and/or used as input to a fault isolation engine to determine anomalies in the system under test.

36 Claims, 4 Drawing Sheets

U.S. PATENT DOCUMENTS

| | | |
|---|---|---|
| 8,132,053 B2 | 3/2012 | Kube et al. |
| 2001/0054174 A1 | 12/2001 | Boggs et al. |
| 2003/0033404 A1* | 2/2003 | Richardson .................. 709/224 |
| 2003/0051163 A1 | 3/2003 | Bidaud |
| 2006/0090100 A1 | 4/2006 | Holzapfel et al. |
| 2006/0184928 A1 | 8/2006 | Hughes |
| 2007/0220342 A1 | 9/2007 | Vieira et al. |
| 2008/0059106 A1 | 3/2008 | Wight et al. |
| 2008/0086660 A1 | 4/2008 | Wefers |
| 2008/0115112 A1 | 5/2008 | Sharma |
| 2008/0120521 A1 | 5/2008 | Poisson et al. |
| 2008/0184206 A1 | 7/2008 | Vikutan |
| 2009/0254312 A1 | 10/2009 | Kube et al. |

OTHER PUBLICATIONS

Hanford, K.V., Automatic Generation of Test Cases, IBM Systems Journal, vol. 9, Issue 4, pp. 242-257, 1970.

Lammel, R., and W. Schulte, Controllable Combinatorial Coverage in Grammar-Based Testing, Proceedings of the 18th IFIP TC6/WG6.1 International Conference, TestCom 2006, New York, New York, May 16-18, 2006.

Model-Based Testing of a Highly Programmable System, Software Reliability Engineering, Proceedings of the Ninth Symposium on, Nov. 4-7, 1998.

Sirer, E.G., and B.N. Bershad, Using Production Grammars in Software Testing, Second Conference on Domain Specific Languages, Austin, Texas, Oct. 3-5, 1999, pp. 1-13.

Using Attributed Event Grammar Environment Models for Automated Test Generation and Software Risk Assessment of System-of-Systems, Systems, Man and Cybernetics, 2005 IEEE International Conference, vol. 2, pp. 1870-1875.

Auguston et al., Using Attributed Event Grammar Environment Models for Automated Test Generation and Software Risk Assessment of Systems-of-Systems, Systems, Man and Cybernetics, 2005 IEEE International Conference, Oct. 10-12, 2005, vol. 2, pp. 1870-1875.

Dalal, S.R., et al., Model-Based Testing of a Highly Programmable System, Software Reliability Engineering, 1998 Proceedings of the Ninth Symposium on Nov. 4-7, 1998, pp. 174-179.

* cited by examiner

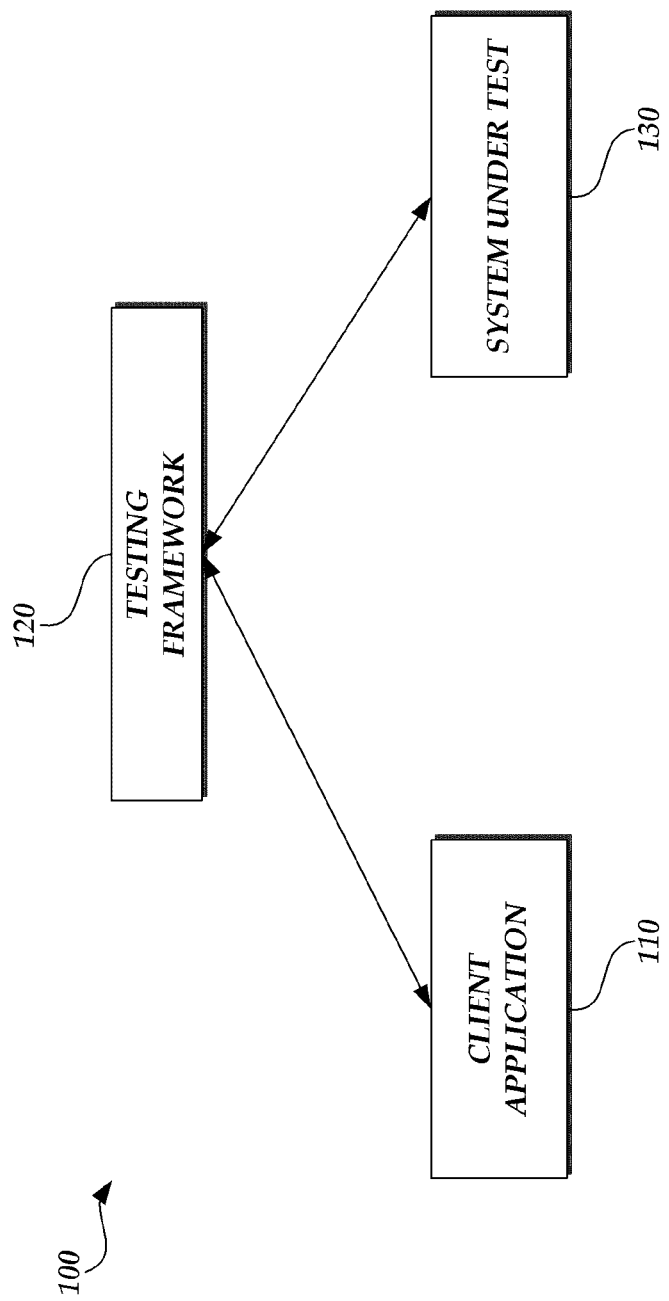

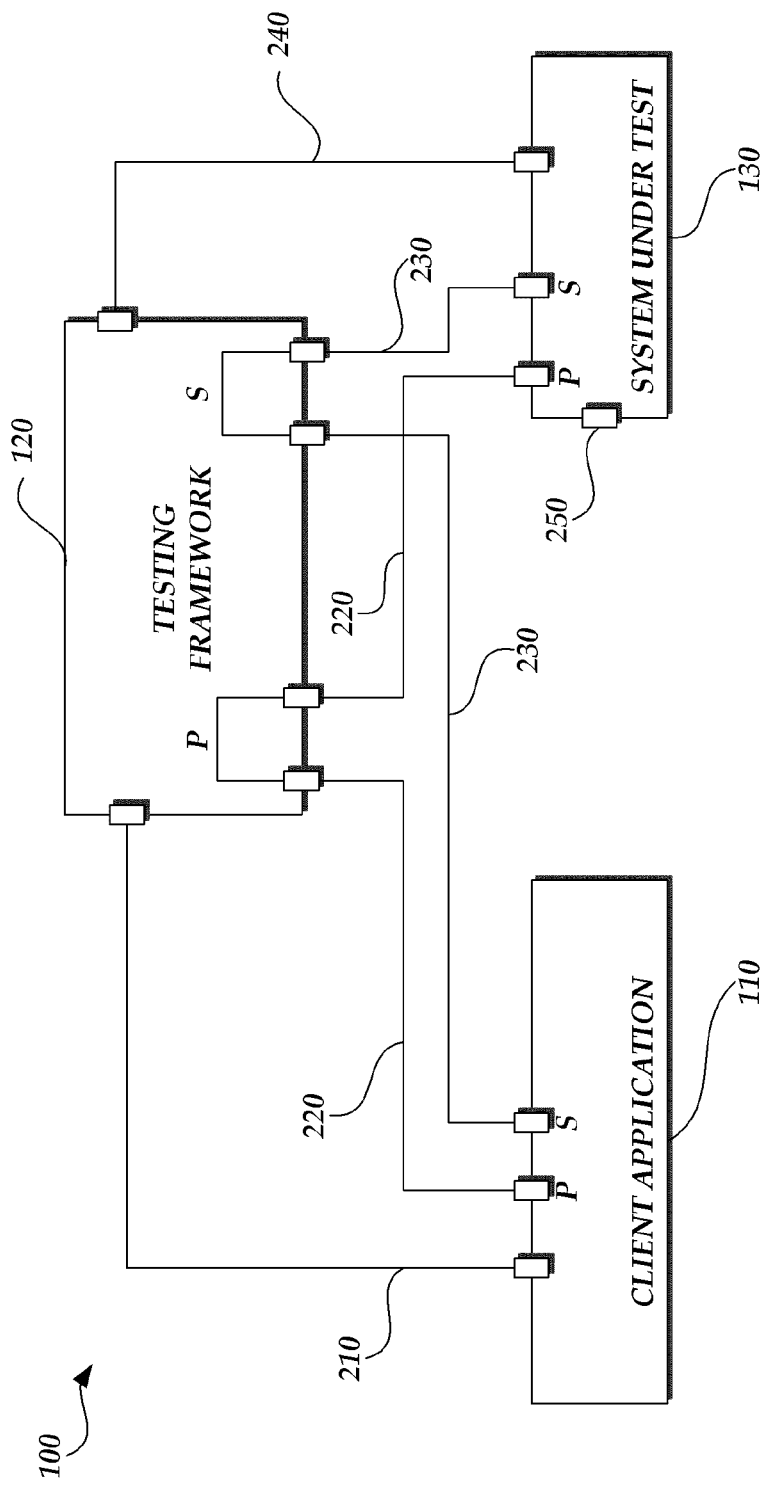

TESTING FRAMEWORK FOR CONTROL DEVICES

CROSS-REFERENCE TO RELATED APPLICATIONS

This application claims the benefit of U.S. Provisional Application No. 61/032,046, entitled "Test Bench for Control Devices," filed Feb. 27, 2008, and U.S. Provisional Application No. 61/077,459, entitled "Testing Framework for Control Devices," filed Jul. 1, 2008, the entirety of which are incorporated herein by reference.

BACKGROUND

Generally described, computing devices can be utilized in a variety of contexts such as for exchanging information, facilitating communication between users, facilitating the operation and control of a wide variety devices and processes, and the like. In the context of a manufacturing or production environment, a computing network made up of a number of computing devices, including personal computing devices, server computing devices, programmable logic controllers (PLCs), and/or other networked devices can be utilized in conjunction with a communication network, such as the Internet, to facilitate the operation and control of various devices/processes. For example, a networked PLC may be utilized to control the operation of physical manufacturing or processing equipment, such as controllers for valves, power supplies, pumps, machinery, etc. Similarly, a software application, or suite of software applications, may be hosted on a networked computing device (such as a server or personal computing device) to receive instructions regarding the operation of various equipment and transmit the appropriate respective instructions to the appropriate equipment (such as through a PLC).

A fault in one or more networked computing devices, such a fault in a computing device, can lead to the failure of associated equipment, loss of manufacturing/production time, property damage, and the like. Accordingly, manufacturing/production computing networks (including hardware and software aspects) can be designed with redundant components to avoid fault conditions during execution in a manufacturing/production environment. For example, a PLC may include a "fail safe" mode such that in the event of a fault, the outputs from the PLC mitigate potential damage to attached equipment or errant instructions that could cause additional faults/damage.

Computing systems can be tested to verify that requirements for safety and redundancy are met and to discover errors in design/implementation. For example, a testing system can be implemented, such as in a laboratory, that attempts to emulate various commands, instructions, or other environmental information and then measure the response generated by the computing device(s) being tested. The emulated commands, instructions, or other environment information can be embodied as a test case or testing procedure that can be executed by a testing system.

One approach to the generation of test cases and/or testing procedures for computing device testing involves the utilization of testing framework that is in communication solely with the device under test. This approach, however, can be inefficient in recreating many of the inputs and/or operating environments associated with the device under test. For example, in a system under test including multiple networked computing devices, the testing framework would need to analyze inputs/outputs from each computing device in the system under test in order to accurately test the system. For example, a computing device in a system under test experiencing an error may still be generating an expected output coinciding with an output generated by the computing device entering a "fail safe" mode. However, in such a fail safe mode, the computing device would not be able to properly process inputs from a control computing device. Accordingly, current testing approaches can become deficient in properly assessing system under test performance as a function of a testing environment.

SUMMARY

The present disclosure generally relates to the automated testing of a system that includes software or hardware components (referred to herein as the "system under test" or "device under test"). In some embodiments, a testing framework generates a set of test cases for a system under test using a grammar. Each test case may perform an action, such as provide an input to the system under test, and result in an output from the system under test. The inputs and outputs are then compared to the expected results to determine whether the system under test is performing correctly. For example, the testing framework can be used to monitor the digital inputs and/or outputs of a programmable logic controller (PLC) and/or determine whether the PLC is performing to its specified behavior. Specifically, the PLC may be analyzed to determine whether it is capable of properly processing control instructions and input signals and/or generating expected output control signals and additional control/feedback information. The data can then be interpreted in the grammar system and/or used as input to a fault isolation engine to determine anomalies in the system under test.

In an illustrative embodiment, the testing framework also collects a set of outputs generated by computing devices associated with a testing environment, such as a client application. In such an embodiment, the testing framework can operate as a communication bridge between components of the system under test or between a control application and a system under test. Additionally, the collected outputs from the computing devices, such as the client application are then utilized in processing the outputs from the system under test to assess performance and/or identify potential faults.

BRIEF DESCRIPTION OF THE DRAWINGS

The present disclosure will now be described in detail below in connection with the following figures in which:

FIG. 1A illustrates a block diagram of an exemplary system capable of automatically generating grammar tags, according to an embodiment of the disclosure;

FIG. 2 illustrates a block diagram of the testing environment of FIG. 1 illustrating the interconnection of inputs and outputs the exemplary components of the systems of FIGS. 1A and 1B.

DETAILED DESCRIPTION

Figure 1B:
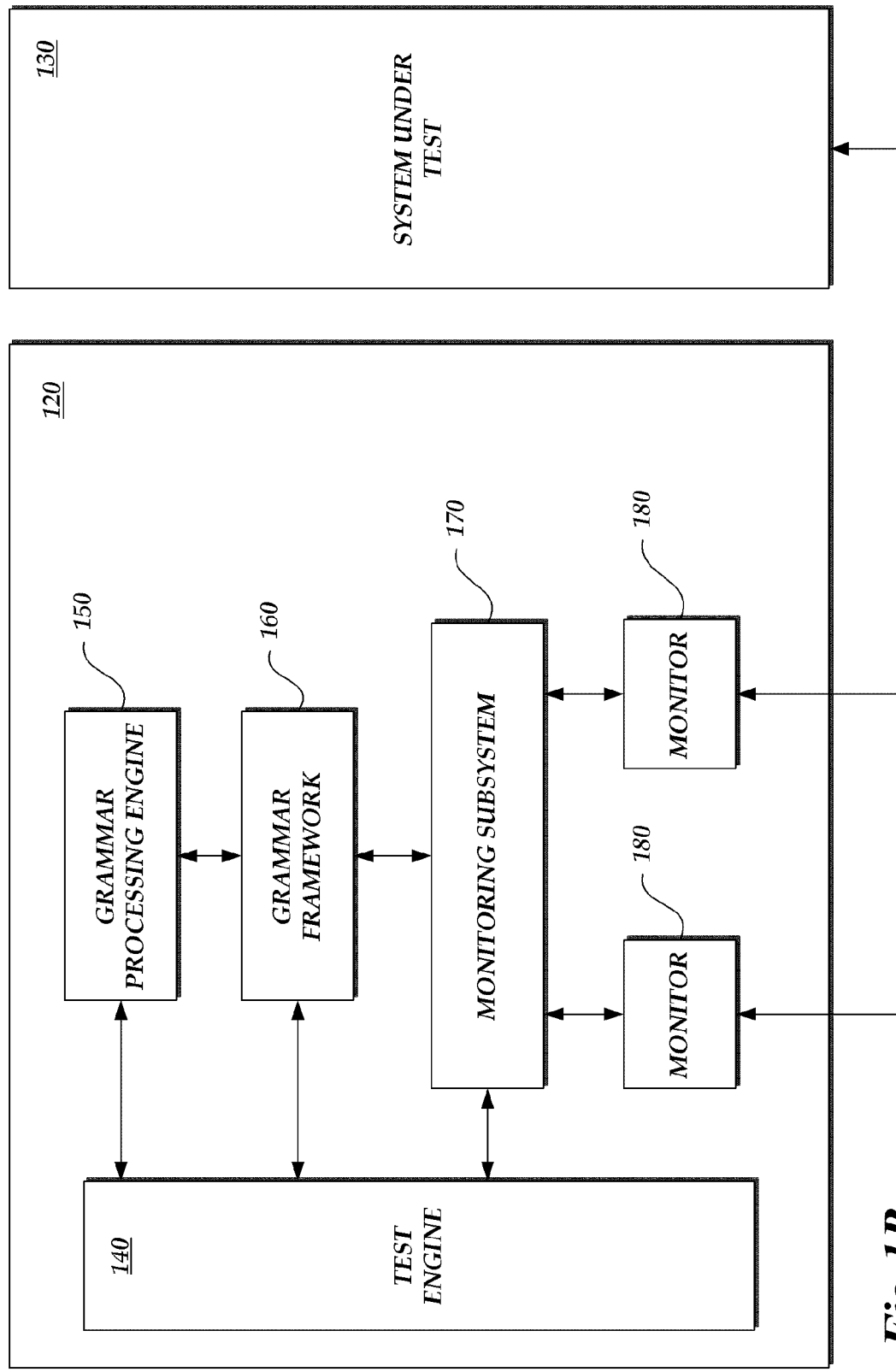
FIG. 1B illustrates exemplary components of the testing framework of FIG. 1A, according to an embodiment of the disclosure.

This disclosure generally relates to testing and testing frameworks. More specifically, it relates to systems and/or methods for providing a testing framework for a system under test. In some embodiments, the testing framework can be used to assess the robustness of process control devices through the monitoring of outputs from one or more components in a testing environment that are typically considered inputs to a system under test. Additionally, the testing framework can assess the robustness of process control devices through monitoring of outputs responsive to a testing sequence (e.g., a series of test cases) provided by the testing framework. The monitored outputs are generated by the system under test and collected by the testing framework.

In accordance with an illustrative embodiment, the testing framework can be used to assess specific vulnerabilities and security threats to control system devices and networks. The present disclosure may be particularly beneficial for systems, such as process control and supervisory control and data acquisition (SCADA) systems, that have traditionally used closed proprietary architectures. However, one skilled in the relevant art will appreciate that the disclosed testing framework, operating environment, test cases, and grammars are illustrative in nature and should not be construed as limiting. Additionally, the present disclosure should not be construed to be applicable to any particular system under test or device under and that all disclosed embodiments are also illustrative in nature.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

FIG. 1A illustrates a block diagram of an exemplary system 100 capable of initiating and processing a test sequence for a system under test. As shown, a client application 110 communicates with a testing framework 120. Testing framework 120 may communicate with system under test 130. Communication within the system may take place over a network using sockets, ports, and other mechanisms recognized in the art. In an illustrative embodiment, communication between the client application 110, the testing framework 120 and the system under test 130 may be facilitated through a standardized communication protocol, such as the Object-Linking and Embedding (OLE) for Process Control standard, generally referred to as "OPC." The communication may also be via wire(s), cable(s), flex circuit(s), wireless technologies, or other suitable analog or digital communication methodologies and devices to perform those methodologies. Client application 110, testing framework 120, and system under test 130 may reside on physically separate machines, such as computers, or be on the same machine. Still further, although client application 110 and testing framework 120 are illustrated in a client-server model, one skilled in the relevant art will appreciate that the system 100 may be implemented in a peer-to-peer network embodiment.

Client application 110 may be an application running on a computing device that allows a user to select configuration and test procedures to run on system under test 130. In an embodiment, where client application resides on a computer separate from testing framework 120, client application 110 may send data to testing framework 120 that specifies the user selected configuration and test procedures to run. After tests have been run on system under test 130, client application 110 can receive results from testing framework 120 and generate reports based on the results. In an alternative embodiment, the client application 110 may be hosted as a network-provided service.

Testing framework 120 may be an application running on a computer server that generates and executes tests on system under test 130 based on the configuration and test procedures selected by the user with client application 110. For example, testing framework 120 can include a web service component running on a computer server or distributed across one or more computers and operative to exchange information via an application programming interface ("API"). When test results are received from system under test 130, testing framework 120 may refine a testing strategy and create a second set of tests that are broader or narrower than the original tests run on system under test 130.

System under test 130 may comprise a computer program, hardware device, and/or a combination of one or more hardware device(s) and computer program(s). For example, the system under test 130 can include an operating system or software application. In another example, the system under test 130 may be a hardware device, such as a programmable logic controller or supervisory control and data acquisition system. As previously discussed, the system under test 130 may be a combination of hardware or software components such as a computing device executing one or more computer programs. In some embodiments, the system under test 130 may be a database, user interface, computer network, and embedded or industrial device. One skilled in the relevant art will appreciate that additional or alternative configurations of the system under test 130 will be considered to be within the scope of the present disclosure. Additionally, although the system under test 130 is referred to as a computer system, the system under test may correspond to a single computing device or computer program.

FIG. 1B illustrates exemplary components of testing framework 120, according to some embodiments of the disclosure. As depicted, testing framework 120 can include a test engine 140, a grammar processing engine 150, a grammar framework 160, and a monitoring subsystem 170. The test engine 140 may coordinate monitoring of the system under test 130, scheduling and managing of interdependencies between testing, launching of the tests, and recording of test results in, for example, a unified reporting structure.

Grammar processing engine 150 may receive results from tests run on system under test 130 from test engine 140. The results may include an actual output from system under test 130 that results from an input being applied to system under test 130. The actual output may be compared to an expected output to determine whether system under test 130 operates as expected. Grammar processing engine 150 can use the results to create a second (new) set of one or more grammars by modifying or inserting tags, attributes, or annotations into one or more grammars of the first (original) set of grammars according to different strategies. For example, grammar processing engine 150 may generate tag combinations that reveal faults. Further, grammar processing engine 150 can generate tags that reduce the total number of test cases generated by finding a smaller set of tags that reveal the already existing faults that have been exposed by the original set of grammars. Additionally, grammar processing engine 150 can perform a neighborhood search, by for example, generating grammars that create a new set of test cases near the original set of test cases.

The grammar framework 160 may typically include a grammar with attributes. The grammar with attributes may describe a set of one or more test cases. Of note, grammar framework 160 may parse the grammar and generate a set of test cases that can be run on the system under test 130. Further, grammar framework 160 can then execute the test cases on system under test 130. As shown, the results of the test cases can also be gathered by grammar framework 160 from system under test 130 to coordinate execution of the test cases.

As further illustrated, monitoring subsystem 170 receives results from executing the test cases on system under test 130. Monitoring subsystem 170 can then use one or monitors 180 to correlate results from the execution of test cases with, for example, the health or status of the system under test 130. This may be advantageous for understanding the effects of test cases on, for example, available memory, processing resources, network response time, and other specific process functionality of system under test 130. Further, monitoring subsystem 170 allows the results of tests to be interpreted in a reliable, repeatable, and affordable manner.

Monitor 180 may use a variety of techniques to observe the environment or health of system under test 130 during testing, for example. As shown, there may be one or more types of monitors. Additionally, there can be one or more instances of each type of monitor 180 in a test environment. Monitors 180 may also correspond to external software or hardware components for observing the system 100 or system under test 130.

In an exemplary embodiment, monitor 180 may receive output from system under test 130 in real time, for example. This may be particularly helpful where the system under test 130 is a device controller. In this situation, a device that is operated by system under test 130 may exhibit normal behavior in response to an erroneous input from system under test 130, often the result of the device entering a fail safe mode. As a result, it may be improperly assumed that system under test 130 is operating correctly as well. A monitor 180 that examines the output of system under test 130, such as step function, would expose this flawed assumption and can therefore be particularly advantageous for ascertaining whether the system under test 130 is actually functioning correctly. To determine whether the system under test 130 is performing as expected, for example, monitor 180 may compare the actual step function to an expected step function. A discrepancy between the step functions can indicate that a test case resulting from a grammar has exposed a fault of system under test 130.

Additionally, monitor 180 may be useful for determining network connectivity. For example, monitor 180 may determine whether system under test 130 is connected to a network or in communication with a device, such as a computer server running a component of testing framework 120. In this embodiment, monitor 180 may use internet control message protocol (ICMP) messages to determine whether the system under test 130 is connected to the network. Alternatively, monitor 180 can use an open connectivity interface to ascertain whether system under test 130 is communicating with other devices.

With reference now to FIG. 2, the interconnection of inputs and outputs the exemplary components of the systems of FIGS. 1A and 1B will be described. As illustrated in FIG. 2, the client application 110 (FIG. 1A) includes a first output corresponding a control signal generated by the client application. In an illustrative embodiment, the control signal corresponds to commands or other input generated by the client application 110 for implementing a testing sequence. The commands can be in accordance with the OPC communication standard.

The client application 110 also includes a primary output 220 and secondary output 230 for generating outputs to the system under test 130. As illustrated in FIG. 2, the primary and secondary output signals pass through the testing framework 120. In this capacity, the testing framework 120 serves as a communication bridge and can modify the input signals.

With continued reference to FIG. 2, the system under test 130 also includes various outputs 240 and 250 which can be routed to the testing framework 130. Outputs, such as outputs 240 and 250, can correspond to both digital and analog signals. For example, output 240 can correspond to a square wave output that can be monitored by the testing framework 130. Output 250 can correspond to USB interfaces for debugging by the client application 110 or other computing device. Output 250 can also correspond to an RS232 data interface for serially communicating additional information regarding the system under test 130. One skilled in the relevant art will appreciate that additional or alternative outputs and output types may also be routed and processed by the testing framework 130.

Figure 3:
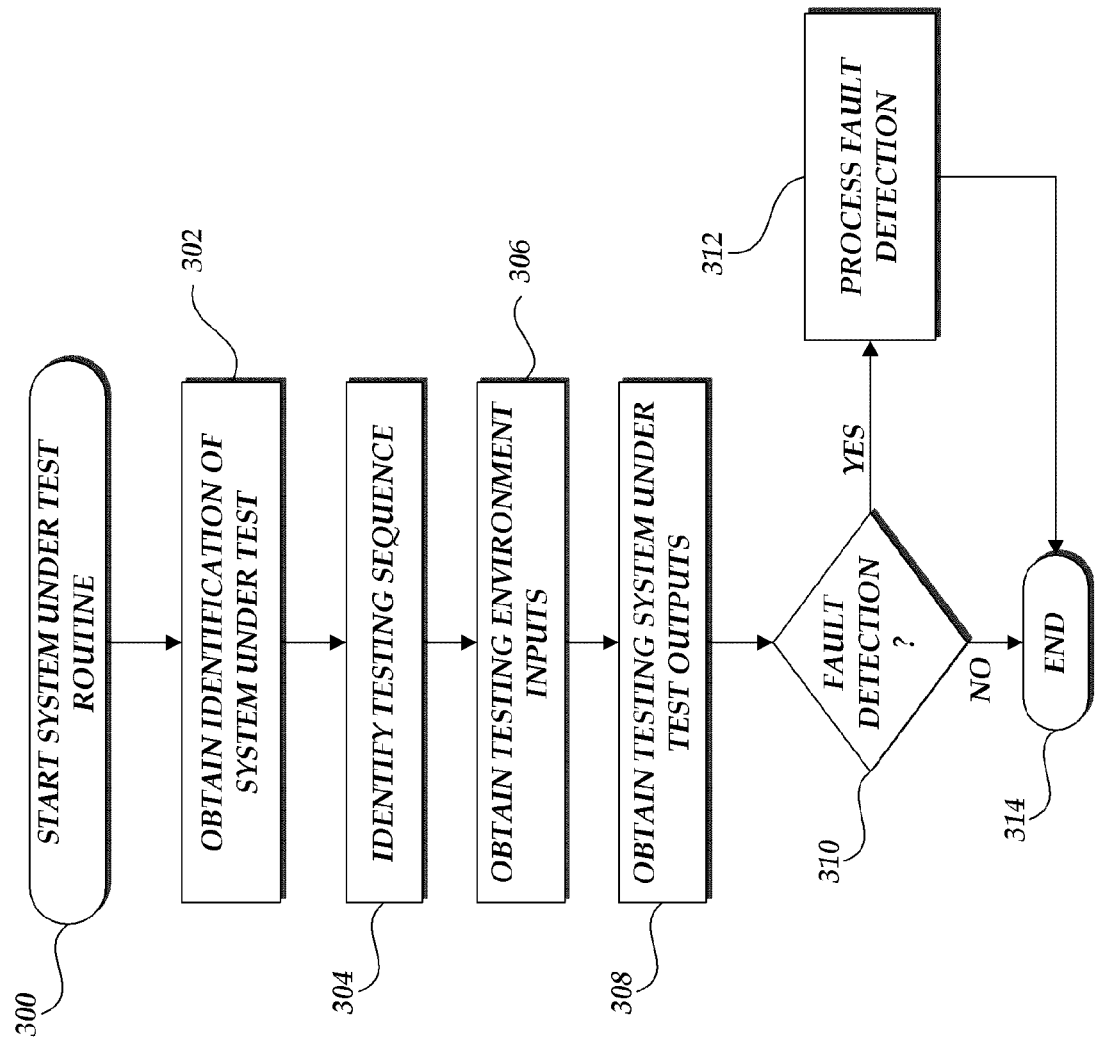
FIG. 3 illustrates a flow diagram illustration of a system under test testing routine performed by the exemplary components of the systems of FIGS. 1A and 1B, according to an embodiment of the disclosure.

With reference now to FIG. 3, a routine for testing a system under test 130 will be described. At block 302, the testing framework 120 obtains an identification of the system under test 130. In an illustrative embodiment, the identification can corresponds to a manual or automatic process, such as be scanning bar codes, keying serial numbers, etc. At block 304, the testing framework identifies the testing sequence. In an illustrative embodiment, the testing sequence is generated by the grammar processing engine 150 (FIG. 1B) by processing various grammar attribute tags. The specific testing sequence may be based on the identification of the system under test 130 and/or additional user interaction. Additionally, in an illustrative embodiment, the testing sequence may correspond to various iterations of a testing grammar in which the results from a previous test of the system under test 130 is used to modify the testing grammar and/or create a new testing grammar.

At block 306, the testing framework collects testing environment inputs from the client application. As previously described, in an illustrative embodiment, the testing framework 120 functions as a communication bridge between the client application 110 and the system under test 130. At block 308, the testing framework obtains the outputs from the system under test 130. At decision block 310, a test is conducted to determine whether a fault has been detected.

In some embodiments, the client application 110 may send a new input instruction which is not properly serviced by the system under test 130. The system under test 130 may not recognize the input and/or understand the instruction. In some embodiments, because the existing state of the system under test 130 is "ON"; the system under test 130 "fail-safe" response may be to assume that the instruction sent was to accomplish a change of state. For example, since the system under test 130 is "ON", the expected instruction is "OFF", and so the system under test 130 in "fail-safe" mode may switch the system under test 130 off, although the system under test 130 could not read and/or service (vulnerability) the "off" instruction.

In some embodiments, to an operator of the client application 110 it can seem that the system under test 130 is a properly function device since the "OFF" instruction produced the desired output, it did in fact turn the system under test 130 "OFF," but that may be as an indirect result of a vulnerability (which hence may be overlooked by the testing operator). The client application 110 may be unaware that the system under test 130 was turned off by the "fail-safe" instructions rather than processing the particular input command. The failure to properly "service" the input command may be an error that indicates the presence of a vulnerability and/or "point of entry," that if not corrected, can be exploited, either accidentally and/or purposefully.

Another example where the client application 110 can indicate a system under test 130 is "secure" when it is not, can be when instructions are sent to the system under test 130 at a high and/or irregular rate of speed. In this example, the system under test 130 vulnerability may be that it cannot "understand" and/or "service" input instructions at such rates of speed. This vulnerability can prevent the system under test 130 from servicing and/or responding to each individual instruction within the "storm of instructions." For example, the system under test 130 may be executing, for example, every fourth instruction to provide the predetermined result, such as switching to "OFF," and/or some other change of state.

For example, a system under test 130 error may result in the input instructions being ignored and/or "unserviced" by leaving the system under test 130 in its existing state—and/or changing the system under test 130 output state in an erratic fashion with each test, thereby preventing the isolation and/or diagnosis of the fault (vulnerability) in the code. Examples of variations on the input instructions from expected can including delaying the sending on instructions, intentionally reordering instructions or corrupting some portion of the instructions. Advantageously, the testing framework 120 can receive real-time feed back while the system under test is servicing the input. In so doing, the operator can determine if an input instruction is serviced by the system under test 130 in the correct order.

In some embodiments, if the instruction is not serviced in the correct order, the testing framework can allow the client application 110 to identify the exact place and/or time of the system under test 130 fault rather than just traditionally looking at the output to see if it matches the predetermined state. The "place and/or time of fault" can be as useful as the fact that the output was incorrect. In some embodiments, the testing framework 120 can isolate the time and/or place of the vulnerability, and/or determine that the vulnerability may be indicative that a code error and/or vulnerability may exist in the actual line of code servicing the input and/or in a close and/or related line of instructions.

In some embodiments, a real time testing framework 120 is provided to track and/or watch how the system under test 130 handles, executes and/or services the input instructions. This provides several advantages over looking for the predetermined output to "confirm" that the system under test 130 is performing correctly (or incorrectly, as the case may be). Using the systems and methods provided, the actual error in the executable code can be determined and/or pinpointed. Further, the testing framework 120 can enable a tester to assess what is actually happening to the system under test 130 in real time and/or the "change of states" in the system under test 130. For example, the physical activity of the controller under test can be assessed and/or the implications of how the input is "serviced" by each system under test 130.

The testing framework 120 can define a model of expected behavior and/or compare the measured behavior to the model. In some embodiments, for example, a detection model based on a square wave output with a static frequency can be used. The frequency can be 1 Hz.

Anomalies can be detected by measuring the time between state transitions and/or comparing the value to the expected value of ½ the signal period:

$$\text{Error} = \text{time}_{current} - \text{time}_{last} / 0.5 * \text{period}$$

In some embodiments, if the measured value is not equal to the expected value (within a tolerance for error), and/or the difference exceeds thresholds defined by the user, then the appropriate warning and/or alarm is issued.

The detection model includes support for three fail-safe modes:
1) Last-value, where the system under test 130 can maintain the state of the output in the last state it was in.
2) High, where the system under test 130 may change the output state to 24V.
3) Low, where the system under test 130 may change the output state to 0V.

These three signal states can be detected as anomalies when the detection model is based on a periodic function because when the device enters fail-safe mode, the output rate of change becomes 0.

In some embodiments, the output single of the system under test 130 can be a square wave with a period of 1 second. A model can specify that the voltage level read from the digital input should change state (from high to low, and/or low to high), for example, every 500 milliseconds. Each time there may be a transition between logical states, it can calculate the time delta from the last recorded transition. In some embodiments, if the time delta between transitions does not equal the expected change plus or minus (+/−) an error margin the behavior can be considered anomalous. The error margin can include, for example, latencies in the hardware and/or software of the system under test 130 and/or the discrete monitor, limitations in timing accuracy, and/or the like. This can be represented by the following inequality:

$$\text{Expected\_Period} - \text{error} < \text{StateChangeTime}_{current} - \text{StateChangeTime}_{current-1} < \text{Expected\_Period} + \text{error}$$

Metrics such as the magnitude of the delta between missed transitions (either too long and/or two short) and/or the frequency of missed transitions can be applied to heuristics that help to automate the determination if the anomalous behavior is the device entering a predictable fail-safe mode. In some embodiments, the transitions can be checked for randomness and/or patterns in trend data can be observed to determine a behavior. If the behavior deviates from the model this may be considered a symptom of a possible software flaw.

Returning to FIG. 3, if a fault is detected at decision block 310, at block 312, the testing framework 120 processes the fault detection. In an illustrative embodiment, the fault is noted, such as in an error log. In another embodiment, the testing sequence may be terminated to prevent damage to the system under test 130 or other device. In still a further embodiment, the fault condition may be used as feedback to modify the testing grammar. If no fault is detected at decision block 310 or once the fault detection is processed at block 312, at block 314, the routine 300 terminates.

While illustrative embodiments have been disclosed and discussed, one skilled in the relevant art will appreciate that additional or alternative embodiments may be implemented within the spirit and scope of the present disclosure. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with the scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer-readable medium storing the computer executable components, such as a CD-ROM, DVD-ROM, or network interface. Further, the component and/or data can be included in a single device or distributed in any manner. Accordingly, general purpose computing devices may be configured to implement the processes, algorithms and methodology of the present disclosure with the processing and/or execution of the various data and/or components described above. Alternatively, some or all of the methods described herein may alternatively be embodied in specialized computer hardware. In addition, the components referred to herein may be implemented in hardware, software, firmware or a combination thereof.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A testing apparatus comprising:
a communication bridge component operative to obtain control instructions generated by a client application and to transmit the control instructions to a device, wherein the control instructions comprise instructions to cause a change in at least one state of the device when processed by the device;
a device output component operative to obtain an output signal from the device, wherein the output signal from the device is responsive to changes in the at least one state of the device in substantially real time based on the control instructions transmitted by the communication bridge component; and
a data processing component for assessing computing device functionality in substantially real time based on a comparison of the control instructions and the output signal from the device, wherein the data processing component determines whether the device has entered a failsafe mode based on the comparison of the control instructions and the output signal from the device.

2. The testing apparatus as recited in claim 1, wherein the control instructions correspond to internet control message protocol messages.

3. The testing apparatus as recited in claim 1, wherein the control instructions correspond to a set of test cases generated by the client application.

4. The testing apparatus as recited in claim 3 further comprising a grammar engine component for generating the set of test cases based on processing a testing grammar.

5. The testing apparatus as recited in claim 1, wherein the communication bridge component includes a first bridge component operative to bridge control instructions transmitted over a primary control channel.

6. The testing apparatus as recited in claim 5, wherein the communication bridge component further includes a second bridge component operative to bridge control instructions transmitted over a secondary control channel.

7. The testing apparatus as recited in claim 1, wherein the output signal from the computing device corresponds to a square wave.

8. The testing apparatus as recited in claim 1, wherein the device output component is further operative to obtain additional outputs generated by the computing device.

9. The testing apparatus as recited in claim 1, wherein assessing computing device functionality in substantially real time based on a comparison of the control instructions and the output signal from the device includes comparing a timing of changes in the output signal to an expected timing of changes in the at least one state of the device based on the control instructions.

10. A system for testing computing devices, comprising:
a client application component for generating control instructions for a device under test, wherein the control instructions comprise instructions to cause a change in at least one state of the device when processed by the device; and
a testing component for obtaining the generated control instructions from the client application component, transmitting the control instructions to the device under test, and obtaining at least one output signal generated by the device under test, wherein the at least one output signal generated by the device under test is responsive to changes in the at least one state of the device in substantially real time based on the control instructions;
wherein device performance is assessed based on an analysis of the generated control instructions and the at least one output signal generated by the device under test to determine whether the device has entered a failsafe mode based on the analysis of the generated control instructions and the at least one output signal generated by the device under test.

11. The system as recited in claim 10, wherein the control instructions correspond to a set of test cases generated by the client application component.

12. The system as recited in claim 11 further comprising a test case generation component operative to generate the set of test cases from a test grammar.

13. The system as recited in claim 12, wherein the test grammar includes a set of attributes.

14. The system as recited in claim 13, wherein the test generation component generates the set of test cases based on processing the attributes in the test grammar.

15. The system as recited in claim 10, wherein the client application component transmits control instructions over a first and second channel.

16. The system as recited in claim 15, wherein the testing component includes a first communication port for obtaining control instructions from the client application over a first communication channel and for transmitting control instructions to the device under test over the first communication channel.

17. The system as recited in claim 16, wherein the testing component includes a second communication port for obtaining control instructions from the client application over a second communication channel and for transmitting control instructions to the device under test over the second communication channel.

18. The system as recited in claim 10, wherein the at least one output signal generated by the device under test corresponds to a square wave.

19. The system as recited in claim 10, wherein the analysis of the generated control instructions and the at least one output signal generated by the device under test includes—an analysis of the at least one output signal based on a timing of transmission of the control instructions.

20. The system as recited in claim 19, wherein the—analysis of the at least one output signal based on the timing of transmission of the control instructions corresponds to—an analysis of the at least one output signal based on a change in the timing of transmission of the control instructions.

21. The system as recited in claim 19, wherein the analysis of the at least one output signal based on the timing of transmission of the control instructions corresponds to a comparison of the at least one output signal and a variation of the timing of transmission of the control instructions.

22. The system as recited in claim 10, wherein the analysis of the generated control instructions and the at least one output signal generated by the device under test corresponds to an analysis of the at least one output signal generated by the device under test based on a specific order of control instructions.

23. The system as recited in claim 22, wherein the analysis of the at least one output signal includes a determination of a transition of the output signal from a first state to a second state.

24. The system as recited in claim 23, wherein the determination of a transition of the output signal from a first state to a second state includes a determination of a time required to achieve the transition from the first state to the second state.

25. The system as recited in claim 24, wherein the analysis of the at least one output signal generated by the device under test based on a specific order of control instructions includes comparing the time required to achieve the transition from the first state to the second state with an expected timing of the transition from the first state to the second state based on the specific order of the control instructions.

26. A method for testing comprising:
   obtaining at least one control instruction, wherein the at least one control instruction is generated for a device under test, and wherein the at least one control instruction comprises an instruction to cause a change in at least one state of the device when processed by the device;
   transmitting the at least one control instruction to the device under test;
   obtaining at least one output signal from the device under test, wherein the at least one output signal is generated as a function of changes in the at least one state of the device based the at least one control instruction; and
   assessing functionality of the device under test based on an analysis of the at least one control instruction and the at least one output wherein the analysis includes wherein a determination of whether the device has entered a fail-safe mode based on the comparison of the control instructions and the output signal from the device under test.

27. The method as recited in claim 26 further comprising generating the at least one control instruction.

28. The method as recited in claim 27, wherein generating the at least one control instruction includes obtaining a test grammar including one or more testing attributes and generating the at least one control instruction from the test grammar.

29. The method as recited in claim 26, wherein transmitting the at least one control instruction to the device under test includes transmitting at least one control instruction over a primary communication channel.

30. The method as recited in claim 29, wherein transmitting the at least one control instruction to the device under test further includes transmitting at least one control instruction over a secondary communication channel.

31. The method as recited in claim 26, wherein obtaining at least one output signal from the device under test includes obtaining a square wave output from the device under test.

32. The method as recited in claim 26, wherein assessing functionality of the device under test based on an analysis of the at least one control instruction and the at least one output signal includes comparing the at least one output with a timing of transmission of a set of control instructions.

33. The method as recited in claim 26, wherein assessing performance of the device under test based on an analysis of the at least one control instruction and the at least one output signal includes—comparing the at least one output signal with an order of a set of control instructions.

34. The method as recited in claim 33, wherein comparing the at least one output signal with an order of a set of control instructions includes determining a state transition from a first state to a second state.

35. The method as recited in claim 34, wherein comparing the at least one output signal with an order of a set of control instructions further includes determining a timing associated with the state transition from the first state to the second state.

36. The method as recited in claim 35, wherein comparing the at least one output signal with an order of a set of control instructions further includes comparing the timing associated with the state transition from the first state to the second state with an expected timing of the state transition from the first state to the second state based on the order of the set of control instructions.

* * * * *

UNITED STATES PATENT AND TRADEMARK OFFICE
CERTIFICATE OF CORRECTION

| | | |
|---|---|---|
| PATENT NO. | : 8,433,542 B2 | Page 1 of 1 |
| APPLICATION NO. | : 12/395363 | |
| DATED | : April 30, 2013 | |
| INVENTOR(S) | : Kube et al. | |

It is certified that error appears in the above-identified patent and that said Letters Patent is hereby corrected as shown below:

In the Claims

Column 11, line 15, in Claim 19, change "includes—an" to --includes an--.

Column 11, lines 18-19, in Claim 20, change "the—analysis" to --the analysis--.

Column 11, line 20, in Claim 20, change "to—an" to --to an--.

Column 12, line 4, in Claim 26, after "based" insert --on--.

Column 12, line 39, in Claim 33, change "includes—comparing" to --includes comparing--.

Signed and Sealed this
First Day of October, 2013

Teresa Stanek Rea
*Deputy Director of the United States Patent and Trademark Office*